United States Patent
Chiang

(10) Patent No.: US 9,722,695 B2
(45) Date of Patent: Aug. 1, 2017

(54) OPTICAL NETWORK UNIT AND OPTICAL DETECTING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Po-Wen Chiang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/946,984

(22) Filed: Nov. 20, 2015

(65) Prior Publication Data
US 2017/0026112 A1    Jan. 26, 2017

(30) Foreign Application Priority Data
Jul. 22, 2015   (TW) .............................. 104123791 A

(51) Int. Cl.
  *H04B 10/00*   (2013.01)
  *H04B 10/077*  (2013.01)
  *H04Q 11/00*   (2006.01)
(52) U.S. Cl.
  CPC ..... *H04B 10/0777* (2013.01); *H04Q 11/0067* (2013.01); *H04Q 2011/0083* (2013.01)

(58) Field of Classification Search
  CPC .............................. H04B 10/07; H04B 10/516
  See application file for complete search history.

(56) References Cited

U.S. PATENT DOCUMENTS 7,949,025 B2 *   5/2011   Olea ........................ H01S 5/068
                                                372/38.02
2015/0003823 A1 * 1/2015   Kawanishi ............. H04B 10/07
                                                398/17

(Continued)

FOREIGN PATENT DOCUMENTS

CN       102916742 A        2/2013
TW       201503611 A        1/2015
WO       2015/062015 A1     5/2015

*Primary Examiner* — Dzung Tran
(74) *Attorney, Agent, or Firm* — Steven Reiss

(57) ABSTRACT

An optical network unit (ONU) includes an optical transceiver module, a switch, a detecting module, and an ONU chip. The switch is electronically coupled between the optical transceiver module and a power supply. The detecting module is electronically coupled between the switch and the power supply. The detecting module includes a sensor, an amplifier, and a comparator. The sensor is electronically coupled between the power supply and the switch to sense a driving current output from the power supply to the optical transceiver module and output a voltage signal to the amplifier, the amplifier amplifies the voltage signal and outputs an amplified voltage signal to the comparator, the comparator compares the amplified voltage signal with a predetermined voltage signal and outputs a comparison result. The ONU chip controls the switch to connect/disconnect the electrical connection between the optical transceiver module and the power supply according to the comparison result.

9 Claims, 2 Drawing Sheets

(56) References Cited

U.S. PATENT DOCUMENTS

2015/0316794 A1* 11/2015 Hayakawa .............. G02F 1/025
  385/2
2015/0372767 A1* 12/2015 Inoue ................... H04B 10/116
  398/118

* cited by examiner

OPTICAL NETWORK UNIT AND OPTICAL DETECTING METHOD

FIELD

The subject matter herein generally relates to optical networks, and particularly to an optical network unit and an optical detecting method.

BACKGROUND

At present, the passive optical network (PON), as a broadband optical access technology, usually uses a point to multi-point (P2MP) topology. The PON includes an optical line terminal (OLT), an optical distribution network (ODN), and one or more optical network units (ONUs). The OLT is located in a central office and connected to a service network through a service network interface, and implements access of multiple services according to a certain format. The ONU is located at a customer premise, and mainly implements service multiplexing/demultiplexing and user network interface functions. The ODN provides shared optical transmission media for a physical connection between the OLT and the ONU, uses a passive optical splitter to form a tree topology, and implement transparent transmission of a service.

BRIEF DESCRIPTION OF THE DRAWINGS

Implementations of the present technology will now be described, by way of example only, with reference to the attached figures.

DETAILED DESCRIPTION

Figure 1:
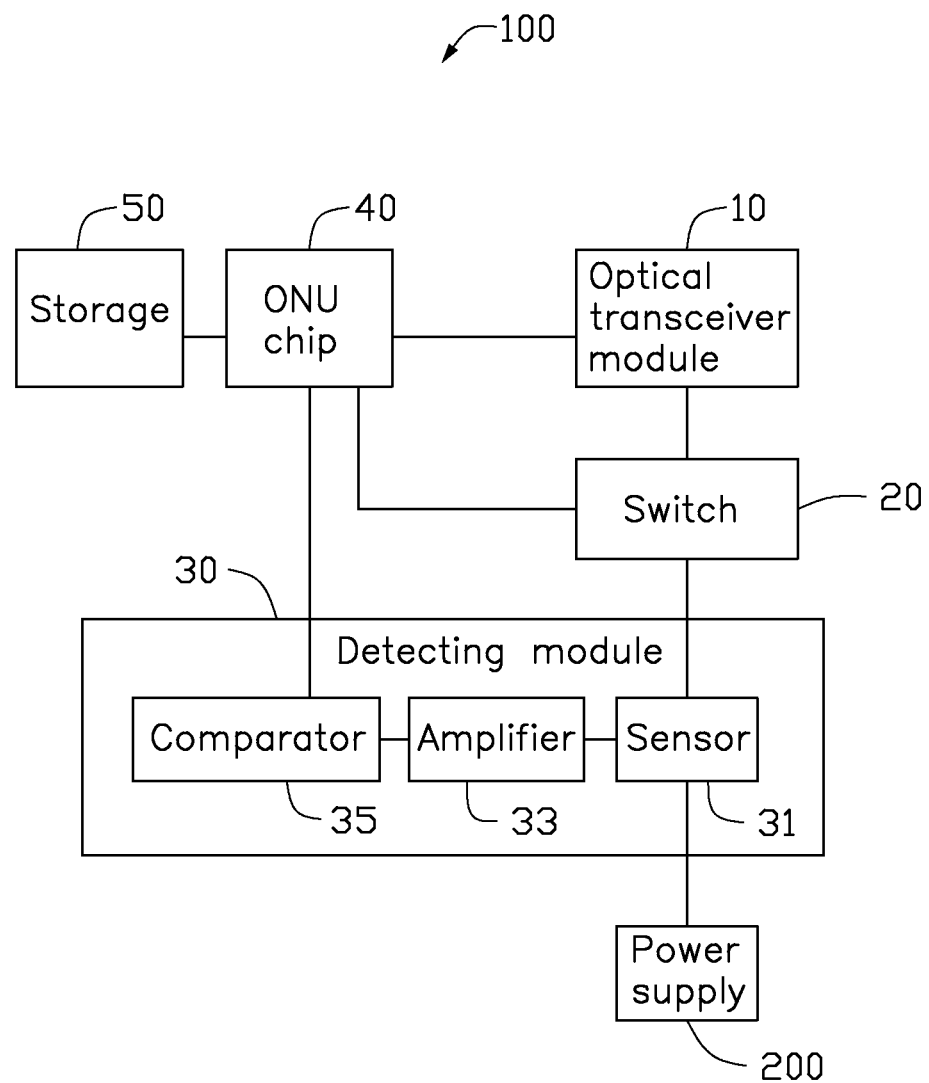
FIG. 1 is a block diagram of an optical network unit, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an optical network unit and an optical detecting method.

FIG. 1 illustrates an embodiment of an optical network unit (ONU) 100, according to an exemplary embodiment. The optical network unit 100 includes an optical transceiver module 10, a switch 20, a detecting module 30, an ONU chip 40, and a storage 50.

The optical transceiver module 10 is configured to convert an electric signal into an optical signal, so that the optical signal can be transmitted by the optical transceiver module 10. In at least one embodiment, the optical transceiver module 10 is electronically coupled to a power supply 200 for receiving a driving current.

The switch 20 is electronically coupled to the optical transceiver module 10, and is configured to connect/disconnect an electrical connection between the optical transceiver module 10 and the power supply 200.

The detecting module 30 is electronically coupled between the power supply 200 and the switch 20, and is configured to detect the driving current transmitted from the power supply 200 to the optical transceiver module 10. In at least one embodiment, the detecting module 30 includes a sensor 31, an amplifier 33, and a comparator 35. The amplifier 33 is electronically coupled between the sensor 31 and the comparator 35.

The sensor 31 is electronically coupled between the power supply 200 and the switch 20, and is configured to sense the driving current transmitted from the power supply 200 to the optical transceiver module 10 and output a voltage signal to the amplifier 33 in response to sensing the driving current. The amplifier 33 is configured to amplify the voltage signal and output an amplified voltage signal to the comparator 35. The comparator 35 is configured to compare the amplified voltage signal with a predetermined voltage signal and output a comparison result to the ONU chip 40. In at least one embodiment, if the amplified voltage signal is greater than the predetermined voltage, the comparator 35 outputs a first comparison result (a logic "1", for example). At this time, the optical transceiver module 10 is turned on. If the amplified voltage signal is less than the predetermined voltage, the comparator 35 outputs a second comparison result (a logic "0", for example). At this time, the optical transceiver module 10 is turned off.

The ONU chip 40 is electronically coupled to the optical transceiver module 10, the switch 20, the comparator 35, and the storage 50. The ONU chip 40 receives the comparison result from the comparator 35, and determines whether a light duration of the optical transceiver module 10 is greater than a predetermined time period. Thus, the ONU chip 40 controls the switch 20 to connect/disconnect the electrical connection between the optical transceiver module 10 and the power supply 200.

In at least one embodiment, the ONU chip 40 determines whether the optical transceiver module 10 is normal according to the first comparison result output from the comparator 35. In detail, the ONU chip 40 begins to time when the ONU chip 40 receives the first comparison result. If the light duration of the first comparison result is greater than the predetermined time, the ONU chip 40 determines the optical transceiver module 10 is abnormal. That is, the light duration of the optical transceiver module 10 is timeout. At this time, the ONU chip 40 controls the switch 20 to disconnect the electrical connection between the optical transceiver module 10 and the power supply 200. If the ONU chip 40 receives the second comparison result, the ONU chip 40 will not time, and then controls the switch 20 to connect the electrical connection between the optical transceiver module 10 and the power supply 200.

In addition, when the ONU chip 40 determines the optical transceiver module 10 is abnormal, the ONU chip 40 sets an error flag to a pre-set value (a logic "1", for example), and stores the error flag to the storage 50. When the ONU chip 40 is activated, the ONU chip 40 reads the error flag from the storage 50. If the error flag is the pre-set value, the ONU chip 40 controls the switch 20 to disconnect the electrical connection between the optical transceiver module 10 and the power supply 200, and then continues to receive the comparison result from the comparator 35.

Figure 2:
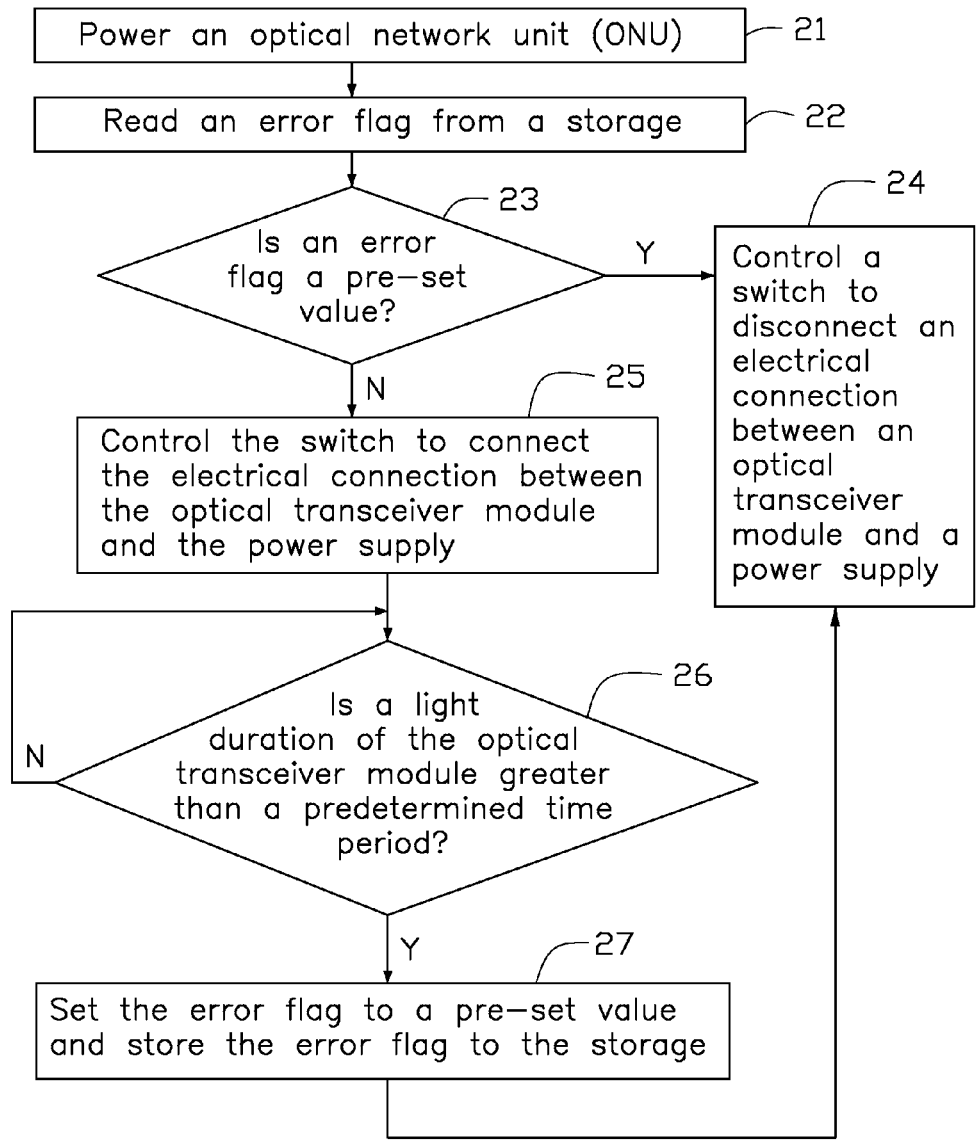
FIG. 2 illustrates a flowchart of an optical detecting method for the optical network unit of FIG. 1.

FIG. 2 illustrates a flowchart of an optical detecting method for the optical network unit 100 of FIG. 1. The method is provided by way of example, as there are a variety of ways to carry out the method. Each block shown in FIG. 2 represents one or more processes, methods, or subroutines which are carried out in the example method. Furthermore, the order of blocks is illustrative only and the order of the blocks can change. Additional blocks can be added or fewer blocks may be utilized without departing from the scope of this disclosure. The example method can begin at block 201.

At block 21, an optical network unit (ONU) is powered on.

At block 22, an ONU chip reads an error flag from a storage.

At block 23, the ONU chip determines whether the error flag is a pre-set value. If the error flag is the pre-set value, block 24 is implemented. If the error flag is not the pre-set value, block 25 is implemented.

At block 24, the ONU chip controls a switch to disconnect an electrical connection between an optical transceiver module and a power supply.

At block 25, the ONU chip controls the switch to connect the electrical connection between the optical transceiver module and the power supply, and then block 26 is implemented.

At block 26, the ONU chip determines whether a light duration of the optical transceiver module is greater than a predetermined time period. If the light duration of the first comparison result is greater than the predetermined time period, the ONU chip determines the optical transceiver module is abnormal, and then block 27 is implemented.

A sensor senses a driving current output from the power supply to the optical transceiver module and outputs a voltage signal to an amplifier in response to sensing the driving current. The amplifier amplifies the voltage signal and outputs an amplified voltage signal to a comparator. The comparator compares the amplified voltage signal with a predetermined voltage signal and outputs a comparison result to the ONU chip. The ONU chip determines whether the optical transceiver module is normal according to the comparison result output from the comparator. If the amplified voltage signal is greater than the predetermined voltage, the comparator outputs a first comparison result (a logic "1", for example). At this time, the optical transceiver module is turned on. If the amplified voltage signal is less than the predetermined voltage, the comparator outputs a second comparison result (a logic "0", for example). At this time, the optical transceiver module is turned off.

At block 27, the ONU chip sets the error flag to a pre-set value (a logic "1", for example), and stores the error flag to the storage, and then block 24 is implemented.

In summary, the ONU chip 40 determines whether the light duration of the optical transceiver module is greater than the predetermined time period, and then controls the switch 20 to connect/disconnect the electrical connection between the optical transceiver module 10 and the power supply 200. Thus, the optical transceiver module 10 can be powered off if the light duration of the optical transceiver module is greater than the predetermined time period. Therefore, the optical network unit 100 will not occupy communication channels for allocating upstream time slots for other ONUs.

The embodiments shown and described above are only examples. Many details are often found in the art such as the other features of the optical network unit and the optical detecting method. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An optical network unit (ONU) comprising:
   an optical transceiver module;
   a switch electronically coupled between the optical transceiver module and a power supply;
   a detecting module electronically coupled between the switch and the power supply and comprising:
      a sensor electronically coupled between the power supply and the switch and configured to sense a driving current output from the power supply to the optical transceiver module;
      an amplifier electronically coupled between the sensor and a comparator, wherein the sensor outputs a voltage signal to the amplifier and the amplifier is configured to amplify the voltage signal and output an amplified voltage signal to the comparator;
      the comparator is configured to compare the amplified voltage signal with a predetermined voltage signal and output a comparison result to the ONU chip; and
   an ONU chip electronically coupled to the optical transceiver module, the switch, and the detecting module;
   wherein the ONU chip controls the switch to connect or disconnect the electrical connection between the optical transceiver module and the power supply according to the comparison result from the comparator;
   wherein the ONU further comprises a storage device electronically coupled to the ONU chip, wherein when the ONU chip determines that the optical transceiver module is abnormal, the ONU chip sets an error flag to a pre-set value, and stores the error flag to the storage device.

2. The optical network unit as claimed in claim 1, wherein if the amplified voltage signal is greater than the predetermined voltage, the comparator outputs a first comparison result, if the amplified voltage signal is less than the predetermined voltage, the comparator outputs a second comparison result.

3. The optical network unit as claimed in claim 1, wherein the ONU chip determines whether the optical transceiver module is normal according to the first comparison result, the ONU chip begins to time when the ONU chip receives the first comparison result, and if a light duration of the first comparison result is greater than a predetermined time period, the ONU chip determines the optical transceiver module is abnormal.

4. The optical network unit as claimed in claim 3, wherein if the ONU chip receives the second comparison result, the ONU chip dose not time, and then controls the switch to connect the electrical connection between the optical transceiver module and the power supply.

5. The optical network unit as claimed in claim 1, wherein when the ONU chip is activated, the ONU chip reads the error flag from the storage, if the error flag is the pre-set value, the ONU chip controls the switch to disconnect the electrical connection between the optical transceiver module and the power supply.

6. An optical detecting method comprising:
powering an optical network unit (ONU);
sensing a driving current output from a power supply to an optical transceiver module and outputting a voltage signal;
amplifying the voltage signal and outputting an amplified voltage signal;
comparing the amplified voltage signal with a predetermined voltage signal and outputting a comparison result; and
controlling a switch to connect/disconnect an electrical connection between the optical transceiver module and the power supply according to the comparison result;
wherein the method further comprises:
reading an error flag from a storage device;
determining whether the error flag is set to a pre-set value;
controlling the switch to disconnect the electrical connection between the optical transceiver module and the power supply if the error flag is set to the pre-set value; and
controlling the switch to connect the electrical connection between the optical transceiver module and the power supply if the error flag is set to the pre-set value.

7. The method as claimed in claim 6, further comprising outputting a first comparison result if the amplified voltage signal is greater than the predetermined voltage, and outputting a second comparison result if the amplified voltage signal is less than the predetermined voltage.

8. The method as claimed in claim 6, further comprising determining whether the optical transceiver module is normal according to the first comparison result and beginning to time when the first comparison result is received, and determining whether the optical transceiver module is abnormal if a time duration of the first comparison result is greater than a predetermined time period.

9. The method as claimed in claim 6, further comprising setting an error flag to a pre-set value and storing the error flag to a storage.

* * * * *